United States Patent
Hilmann et al.

(10) Patent No.: US 11,235,655 B2
(45) Date of Patent: Feb. 1, 2022

(54) VEHICLE BATTERY AND SEAT ASSEMBLY

(71) Applicant: Ford Global Technologies, LLC, Dearborn, MI (US)

(72) Inventors: Joergen Hilmann, Leverkusen (DE); Marius Sawatzki, Pulheim (DE); Simon Jesse, Braintree (GB); Daniel Meckenstock, Wuppertal (DE)

(73) Assignee: FORD GLOBAL TECHNOLOGIES, LLC

( * ) Notice: Subject to any disclaimer, the term of this patent is extended or adjusted under 35 U.S.C. 154(b) by 77 days.

(21) Appl. No.: 16/809,693

(22) Filed: Mar. 5, 2020

(65) Prior Publication Data
US 2020/0282818 A1 Sep. 10, 2020

(30) Foreign Application Priority Data
Mar. 6, 2019 (DE) .......................... 102019203044.0

(51) Int. Cl.
*B60K 1/04* (2019.01)
*B60K 6/28* (2007.10)
(Continued)

(52) U.S. Cl.
CPC .................. *B60K 1/04* (2013.01); *B60K 6/28* (2013.01); *B60N 2/005* (2013.01); *B62D 25/20* (2013.01);
(Continued)

(58) Field of Classification Search
CPC ................ B60K 2001/0422; B60K 2001/0433
See application file for complete search history.

(56) References Cited

U.S. PATENT DOCUMENTS 8,556,016 B2  10/2013  Yoda et al.
8,939,242 B2   1/2015  Kurakawa et al.
(Continued)

FOREIGN PATENT DOCUMENTS

IN  4451/CHE/2013      6/2016
KR  1020120012656 A    2/2012

OTHER PUBLICATIONS

Arcus, "A Tale of 3 Battery Packs", Tesla Model S Battery vs Nissan LEAF Battery vs Chevy Volt Battery, Jan. 6, 2016, https://cleantechnica.com/2016/01/06/a-tale-of-3-battery-packs/.
(Continued)

*Primary Examiner* — Brian L Swenson
(74) *Attorney, Agent, or Firm* — Frank A. MacKenzie; Bejin Bieneman PLC

(57) ABSTRACT

An assembly for a hybrid motor vehicle, in particular a partially electrified hybrid motor vehicle, includes a vehicle battery and a vehicle seat having a seat surface. The vehicle seat is connected or capable of connection to a vehicle floor of the hybrid motor vehicle by means of a seat bottom construction of the seat surface. In addition, the vehicle battery is furthermore arranged or capable of arrangement underneath the vehicle seat and above the vehicle floor and a first stiffened cross member, arranged in front of the vehicle battery in the direction of travel, and a second stiffened cross member, arranged behind the vehicle battery in the direction of travel, are provided. The vehicle battery is moreover connected to the first cross member by means of a first fixing arrangement and/or to the second cross member by means of a second fixing arrangement.

20 Claims, 4 Drawing Sheets

(51) Int. Cl.
  *B60N 2/005* (2006.01)
  *B62D 25/20* (2006.01)
(52) U.S. Cl.
  CPC ... *B60K 2001/0422* (2013.01); *B60Y 2200/92* (2013.01)

(56) References Cited

U.S. PATENT DOCUMENTS

| | | | |
|---|---|---|---|
| 9,636,984 | B1 | 5/2017 | Baccouche et al. |
| 2007/0284167 | A1* | 12/2007 | Watanabe ............. H01M 50/20 |
| | | | 180/68.5 |
| 2011/0284299 | A1* | 11/2011 | Takahashi ............. H01M 50/20 |
| | | | 180/65.21 |
| 2011/0300426 | A1 | 12/2011 | Iwasa et al. |
| 2012/0015257 | A1* | 1/2012 | Arisawa ................. B60L 58/31 |
| | | | 429/400 |
| 2014/0136863 | A1 | 5/2014 | Fritchman et al. |
| 2014/0194049 | A1* | 7/2014 | Kumagai ................ B60L 50/66 |
| | | | 454/143 |
| 2014/0326524 | A1* | 11/2014 | Ogushi .................... B60K 1/04 |
| | | | 180/68.5 |
| 2017/0124277 | A1 | 5/2017 | Shlagman |
| 2017/0267058 | A1* | 9/2017 | Koyama ................. B60L 58/26 |
| 2018/0056894 | A1* | 3/2018 | Tsumura ................. B60K 1/04 |
| 2018/0111483 | A1* | 4/2018 | Nakayama ............. B60K 1/04 |
| 2018/0111499 | A1* | 4/2018 | Wada .................. H01M 50/317 |
| 2018/0126835 | A1* | 5/2018 | Saeki ..................... B62D 21/02 |

OTHER PUBLICATIONS

Massari, "7 Hidden Features of the Audi Q7", AudiWorld, Aug. 18, 2016, https://www.audiworld.com/articles/7-hidden-features-audi-q7/.

* cited by examiner

VEHICLE BATTERY AND SEAT ASSEMBLY

CROSS-REFERENCE TO RELATED APPLICATION

This patent application claims priority to German Application No. DE102019203044.0 filed Mar. 6, 2019, which is hereby incorporated by reference in its entirety.

BACKGROUND

A common variant of a hybrid motor vehicle is the so-called mild hybrid. Although an electric motor is also used in so-called partially electrified hybrid motor vehicles, known as "mild-hybrids" or "mHEV," the torque and battery power alone are not sufficient to power the motor vehicle. The electric drive merely supports the combustion engine in order to boost the power output, without the capacity for fully electric driving. The mild hybrid nevertheless has good fuel-saving potential and in addition can be integrated into existing vehicle concepts with little outlay, whereas a greater development effort is needed for full hybrids. The vehicle battery for such mild hybrids is typically designed as a 48-volt battery.

The secure and at the same time practicable stowage space for the 48-volt battery in such a hybrid motor vehicle is limited. Studies have shown that there is suitable space for the vehicle battery under the driver's seat. This typically involves further restrictions, however, because there is then no longer space available underneath the driver's seat, for example, for the servomotors which afford the facility for automatic adjustment of the driver's seat. Arranging the vehicle battery under the driver's seat therefore typically limits the adjustment of the driver's seat to mechanical devices.

An important aspect in motor vehicles is the safety of the occupants in the event of accidents, which is affected by the configuration and effectiveness of the existing deformation zone or crumple zone. An effective crumple zone serves not only to protect the occupants from the direct mechanical effect, however, but also to protect the vehicle electronics and in the case of a hybrid vehicle, in particular, to protect the vehicle battery. The safety of the driver and the vehicle battery in the area of the driver's seat is typically assessed by the side impact test. In this, a side collision is simulated in which the vehicle laterally impacts rigid objects such as trees or posts or moving objects such as other vehicles.

A desired deformation of the vehicle body is intended to minimize the effects on the driver and the underlying vehicle battery. In this desired deformation the vehicle floor underneath the driver's seat is bent downwards. Since the vehicle battery rests on the vehicle floor, it also sinks or is pulled downwards, which increases the risk of deformation or damage to the vehicle battery. Stiffened cross members are furthermore provided in a transverse direction of the vehicle in the area of the driver's seat and the vehicle floor in order to protect the driver. Here the cross members arranged further behind in the vehicle direction are usually designed weaker than the cross members arranged further forward in the vehicle direction. As a result, in the event of a side impact the deformation also tends to occur, as intended, in the rear area of the vehicle and a direct mechanical effect on the driver and the driver's seat is avoided.

In the prior art various solutions are proposed for protecting the driver and/or the vehicle battery in the event of a vehicle collision.

KR 2012/0012656 A1 relates to a vehicle floor which includes convex areas to accommodate a vehicle battery on its underside. The convex areas here are formed in such a way that a receptacle positively interlocking with the casing shape of the vehicle battery is produced on the underside of the vehicle floor. The vehicle battery and the vehicle floor include stiffened cross struts, in order to prevent unwanted deformations in the event of a vehicle impact.

In US 2011/0300426 A1 the vehicle battery is divided into three portions. Of these, two portions are arranged under a front seat and rear seat respectively, while a third portion is situated between the two seats. This third portion has a reduced overall height of the vehicle battery, so as to leave sufficient foot space for the vehicle occupants. The three-part vehicle battery is connected to a battery mounting frame, which in turn is fitted to a cross strut both on a front side and on a rear side. A similar battery arrangement concept is used, for example, in a number of vehicle models (https://cleantechnica.com/2016/01/06/a-tale-of-3-battery-packs/, consulted on Sep. 5, 2018). IN04551CH2013 likewise discloses the division of a battery storage device for electric vehicles into three portions. One portion is arranged underneath the driver's seat, one portion behind the driver's seats and one portion on the opposite side of the engine, in order to balance the weight of the engine.

US 2017/0124277 A1 discloses an arrangement with battery cells in an aluminum casing. On the outside of the casing flange-like projections are formed integrally with the casing. These projections serve for fixing the casing to the vehicle floor. Additional metal fasteners such as retaining clips, for example, can thereby be dispensed with.

US 2014/0136863 A1 locates three battery modules of a battery unit under the driver's seat, the battery module resting on a support plate. The battery unit is additionally connected to a longitudinal strut of the vehicle body by means of lateral fixing flanges. A bracket-like support device for the driver's seat, which is bolted onto cross struts of the vehicle body to the front and rear of the vehicle battery in the vehicle direction, is provided above the vehicle battery.

In U.S. Pat. No. 8,556,016 B2 a vehicle battery, resting on the vehicle floor, is arranged in an intermediate space, defined on the upper side by the driver's seat. Towards the front in the direction of travel the intermediate space is defined by a cross strut, and to the rear by a raised section of the vehicle floor. The petrol tank is arranged in the rear raised section. Alternatively, the vehicle battery rests in a depression of the vehicle floor.

In view of the prior art set forth, the safeguarding of the vehicle battery in the event of vehicle collisions therefore still affords room for improvement. Although rigid boxes or bracing can protect the vehicle battery from direct mechanical effects, at the same time they reduce the effectiveness of the deformation zone, which has a negative effect on the safety of the vehicle occupants. The deformation process must nevertheless not be allowed to risk damaging the vehicle battery.

DETAILED DESCRIPTION

Figure 1:
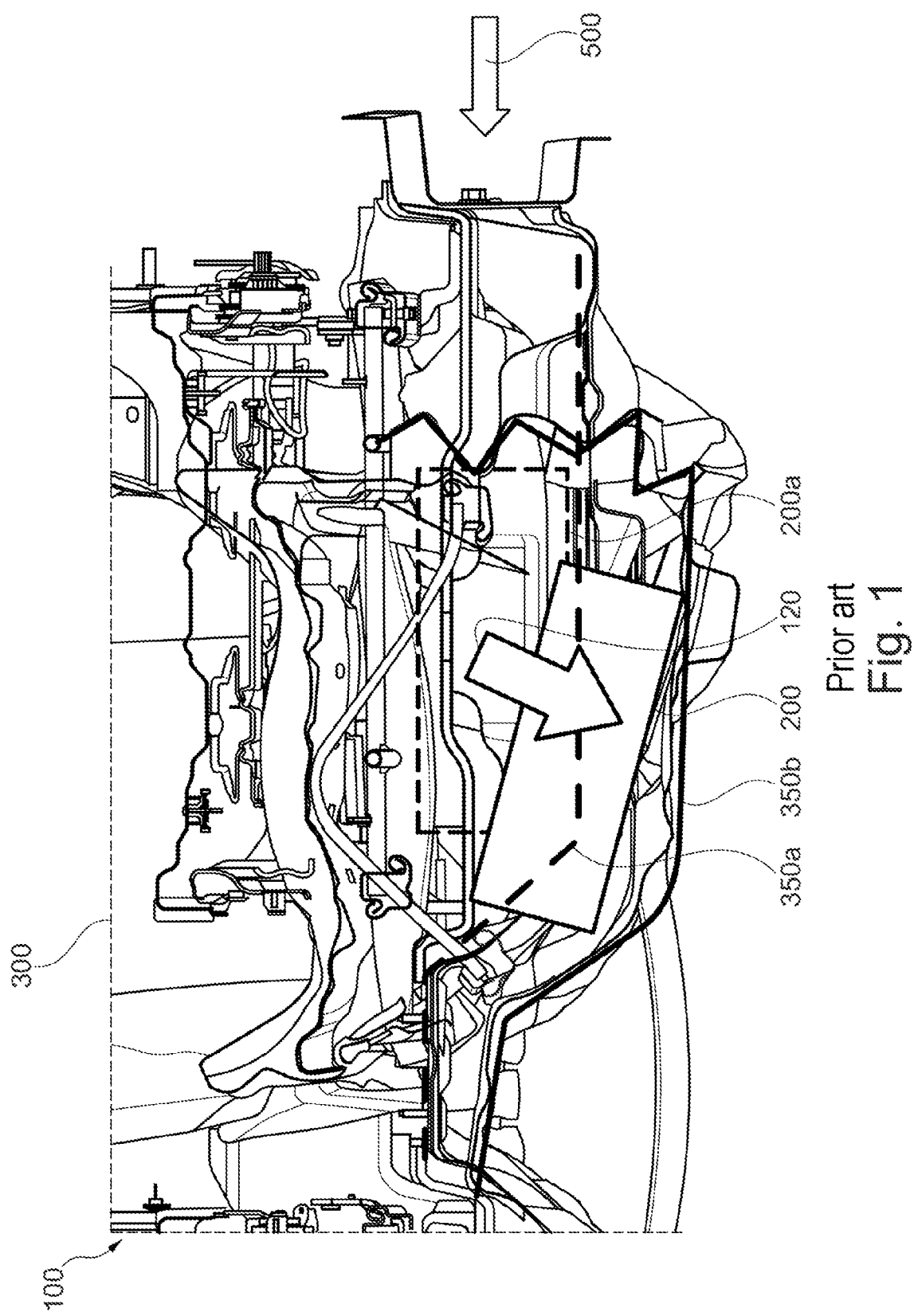
FIG. 1 shows a partially sectional front view of a prior art vehicle seat, vehicle battery, and vehicle floor.

The assembly described herein protects the vehicle battery of a hybrid motor vehicle and at the same time optimizes the deformation zone of the motor vehicle, in order to improve the occupant safety, particularly in the event of a side impact.

The assembly is for a hybrid motor vehicle, in particular a partially electrified hybrid motor vehicle. The vehicle includes a vehicle battery and a vehicle seat, and the vehicle battery is arranged or capable of arrangement underneath the vehicle seat and above the vehicle floor.

It is to be pointed out that the features and measures individually cited in the following description can be combined with one another in any technically suitable manner. The terms "upper area," "lower area," "on the upper side," and "on the underside" are to be interpreted in relation to an operating position of the vehicle. The term "vehicle battery" encompasses the battery itself but also any associated casing or battery cages or protective cages connected to the battery. The term "vehicle transverse direction" means a substantially horizontal direction at right angles to the vehicle longitudinal axis. The vehicle battery can be positioned below the driver's seat, or the vehicle battery may also be arranged underneath any other vehicle seat in the vehicle.

The assembly is for a hybrid motor vehicle, in particular a partially electrified hybrid motor vehicle. The assembly includes a vehicle battery and a vehicle seat having a seat surface. The vehicle seat is connected or capable of connection to a vehicle floor of the hybrid motor vehicle by means of a seat bottom construction of the seat surface. The vehicle battery is furthermore arranged or capable of arrangement underneath the vehicle seat and above the vehicle floor, and a first stiffened cross member, arranged in front of the vehicle battery in the direction of travel or in the vehicle longitudinal direction, and a second stiffened cross member, arranged behind the vehicle battery in the direction of travel or in the vehicle longitudinal direction, are provided. The vehicle battery is moreover connected to the first cross member by means of a first fixing arrangement and/or to the second cross member by means of a second fixing arrangement.

The term "seat bottom construction" means the seat frame underneath the seat surface for a vehicle seat, typically including two seat rails. The seat structure includes the seat bottom construction of the seat and two cross members, on which the seat rails can be mounted. A first cross member is arranged in front of the battery in the direction of travel of the vehicle traveling forward. A second cross member is arranged behind the battery in the direction of travel of the vehicle traveling forward. A first fixing arrangement is arranged in front of the battery in the direction of the vehicle traveling forward. A second fixing arrangement is arranged in front of the battery in the direction of the vehicle traveling forward. The stiffening is designed to run in a vehicle transverse direction, that is at right angles to the vehicle longitudinal direction. In the event of a side impact of the vehicle the cross members remain inherently stable, relatively speaking. Fixing to the stiffened and inherently stable cross members thereby serves to prevent uncontrolled movements even in the event of a side impact of the vehicle. If the vehicle floor is deformed by bending or buckling downwards, the vehicle battery is not pulled downwards or does not sink, since it is connected to the inherently stable cross members. Since the vehicle battery no longer rests on the vehicle floor, the risk of a deformation or other impairment of the vehicle battery can be reduced.

The first fixing arrangement and/or the second fixing arrangement can be connected to the vehicle battery on the underside or in a lower area of the vehicle battery.

The vehicle battery therefore no longer has to rest with an underside on the vehicle floor, but can be arranged, for example, opposite but not in contact with the vehicle floor. In other words, it is no longer necessary for the underside of the vehicle battery to be supported by the vehicle floor. The upper side of the vehicle battery, too, or of the battery casing, is not fixed to the seat bottom construction. The seat structure, that is to say the seat bottom construction with the seat rails and any cross members, possesses sufficient rigidity to prevent an unwanted deformation at the installation site of the battery and/or the battery casing.

The vehicle battery can be arranged above the vehicle floor suspended on the cross members by means of the first and the second fixing arrangements.

The vehicle battery is either arranged at a distance from the vehicle floor, or directly or indirectly touches the vehicle floor with no bearing pressure. The fixing arrangements are a suspension devices. By means of such a suspension device, not only is the vehicle battery secured to prevent it slipping, but the full weight of the vehicle battery is borne entirely or substantially by the fixing device in the form of a suspension device. Fixing of the vehicle battery by means of a suspension device can thereby also be employed regardless of the external shape of the vehicle battery or a casing of the vehicle battery. Whereas the casing of the vehicle battery, when resting with its underside on the vehicle floor, also has to have a plane wall on the underside, with the use of suspension devices the casing can be designed more flexibly. A typical characteristic of suspension devices is that they have a certain freedom of movement in response to vibration or other shocks, in order to even out the vibration. Transmission of the vibration or other shocks, for example when traveling over cobblestones, can thereby be prevented, which can obviate the need for additional cushioning of the vehicle battery or around the vehicle battery. The battery is, so to speak, not immovably fixed.

The first cross member can be additionally stiffened in its design compared to the second cross member.

That is to say the first or front cross member is the stiffer cross member. The deformation process in the event of a side impact in the area of the driver's seat is intended to occur through corresponding deflection or diversion of the force in the rear area of the vehicle. In the event of a vehicle side impact, the front cross member remains inherently stable, while the rear cross member buckles upwards or downwards. As a result, the deformation and the absorption of the impact energy occurs substantially behind the vehicle seat. The full length of the front cross member is thereby also available for secure mounting of the vehicle battery. Even the rear cross member is typically not fully deformed. In the area where the rear cross member is connected to the center tunnel of the vehicle only a slight deformation, if any, occurs, making this connecting area likewise suitable for fixing the vehicle battery. It is also possible for the rear cross member to be stiffened in its design compared to the front cross member, for example close to the rear seats of the vehicle.

The first fixing arrangement and the second fixing arrangement can each include a first portion for connection to the vehicle battery and a second portion for connection to a first cross member supporting surface of the first cross member and/or a second cross member supporting surface of the second cross member.

A "cross member supporting surface" means the upper defining wall of the cross member. In assembling, the second connecting portion may simply be placed on the cross member supporting surface of the cross members and then fixed using any known means of fastening used in vehicle manufacturing. This allows an especially easy and rapid fitting of the assembly. The connecting area of the fixing arrangements situated between the first portion and the second portion is of elongated design, preferably in the form of a resilient connecting strand.

The first fixing arrangement and/or the second fixing arrangement can include at least one or more elongated retaining clips. The elongated retaining clips include a first portion and a second portion.

The design as an elongated or strand-shaped connecting portion or connecting strand saves material in forming the fixing arrangement. The retaining clips with the connecting strand bridge the distance between the cross members and the vehicle battery and allow resilient compensating movements between the vehicle battery and the vehicle, primarily through the choice of resilient material and/or construction. The design as a suspension device allows movement of the vehicle battery relative to the vehicle seat. This relative movement not only allows resilient compensating movements of the vehicle battery in response to vibration or other shocks but can also be utilized for a controlled deformation of the vehicle in the event of a side impact.

The first fixing arrangement can include two retaining clips for connecting the vehicle battery to the first cross member, and the second fixing arrangement can include two retaining clips for connecting the vehicle battery to the second cross member.

The fixing arrangements and/or the retaining clips of the fixing arrangements therefore together with one another form a 4-point support or 4-point suspension for the vehicle battery, which as already described is fitted to the underside or in a lower area of the vehicle battery. The vehicle battery is thereby supported stably but at the same time economically in terms of material.

The first fixing arrangement and the second fixing arrangement can be deformable in a predefined manner to allow for a movement of the vehicle battery in a vehicle transverse direction.

The retaining clips, particularly in the event of a side impact of the hybrid motor vehicle and primarily when the vehicle battery is carried along by the door sill, are deformable in a predefined manner, in particular in a vehicle transverse direction, so as to move in the direction of the center tunnel of the vehicle. The free space between the vehicle battery and the center tunnel is thereby made available for the deformation zone. Such a design of the retaining clips serves to further improve the security of the vehicle battery and the safety of the vehicle occupants in the event of a side impact. The retaining clips are optionally S-shaped or of S-shaped formation, so that the vehicle battery is able to oscillate back and forth between the cross members, but also between the center tunnel and the side sill.

At least one fixing arrangement can be formed with a predetermined break component for the assembly, such as in the form of a retaining clip.

The retaining clips are therefore not only deformed in a predefined manner; they may also break or "fail" in a predefined manner. Should one of the retaining clips break, the 4-point support becomes a 3-point support. The vehicle battery is thereby still temporarily secured to prevent an unwanted sinking in the event of a deformation of the vehicle floor, but a transmission of shear and/or torsional stresses from the retaining clips to the battery casing of the vehicle battery due to the deformation of the vehicle floor can be prevented in the event of a vehicle impact. If the second or rear cross member is of less stiffened design than the first or front cross member and buckles downwards in the event of a side impact, one of the two retaining clips of the rear fixing arrangement can be formed as a predetermined break component having a predetermined breaking point. While the inherently stable areas of the cross members continue to retain the vehicle battery with retaining clips, e.g., three retaining clips, of especially stable design, the fourth retaining clip is sacrificed as predetermined break component, so as not to transmit the mechanical forces due to deformation of the vehicle floor and/or the rear cross member to the vehicle battery. Instead, the three intact retaining clips are deformed in a predetermined manner. The predetermined break component may buckle in the Z-direction, that is to say in the vertical direction of the vehicle, and/or tear under shear forces and/or tensile forces, relieving the load path in the direction of the vehicle battery. The predetermined break component can be the retaining clip which is arranged closer to the side sill. This area closer to the side sill is deformed more heavily in the event of a side impact. The retaining clip which is arranged closer to the center tunnel remains stable. The vehicle body, through deformation of the crash structure, in particular a deformation of the side sill or the cross members under the seat, is thereby able to absorb the necessary amount of kinetic energy in the event of an impact.

In addition, the vehicle seat may include at least one additional cross tie or a cross member between a first seat rail and a second seat rail of the vehicle seat for stiffening the assembly in a vehicle transverse direction, in particular for stiffening a protective battery compartment formed by the seat bottom construction of the vehicle seat.

Within the assembly the seat bottom construction of the seat surface of the vehicle seat forms a protective battery compartment, preferably open at the bottom, to accommodate the vehicle battery, the vehicle battery being arranged or accommodated wholly or partially in the protective battery compartment. Essential protective elements of the protective battery compartments for protection against a side impact are the seat rails, the distance between them being kept constant relative to one another even in the event of a side impact. In a side impact against a post or another obstacle, for example, a protective frame is provided around the vehicle battery underneath the seat surface in the area of the seat bottom construction, substantially parallel to the seat surface and to the vehicle floor, which protects the vehicle battery from an uncontrolled action in a vehicle transverse direction. The seat structure, which encloses the protective battery compartment, must have sufficient rigidity in order to prevent an unwanted deformation of the seat structure itself and of the battery casing/battery cage and the vehicle battery arranged therein. For this purpose, an additional cross member or an additional cross tie is provided as additional cross bracing. This serves to maximize the protective battery compartment underneath the seat surface.

In the various figures the same parts are always provided with the same reference numerals, for which reason these are usually also described only once. In particular, the figures are to be interpreted as masking various components or representing them in simplified form for improved clarity. Although the vehicle battery is shown simplified in the form of a cube, it or the casing or battery cage/protective cage enclosing it may have any suitable external shape.

The front view in FIG. 1 shows an assembly 100, which includes a vehicle battery 200 and a vehicle seat 300. This represents the effect of a vehicle side impact 500, that is to say an impact in a vehicle transverse direction, on the vehicle battery 200, which is arranged between the vehicle floor 350a, 350b and the vehicle seat 300, according to the prior art. A dashed line indicates the undeformed vehicle floor 350a, on which the position of the vehicle battery 200a prior to the impact 500 is drawn in by a dashed line. In a side impact 500 the vehicle body 400 (cf. FIG. 3) and consequently also the vehicle floor 350b, on which the vehicle battery 200 rests or to which it is fixed, is deformed. The vehicle floor 350b sags downwards, with the result that the vehicle battery 200 also executes a downward movement in a direction of movement 120 represented by an arrow drawn in. The vehicle battery 200 is pulled downwards by its own weight and/or by the attachment to the sagging vehicle floor 350b. This carries the risk that the vehicle battery 200 or the casing enclosing it will be deformed or impaired in some other way.

Figure 2:
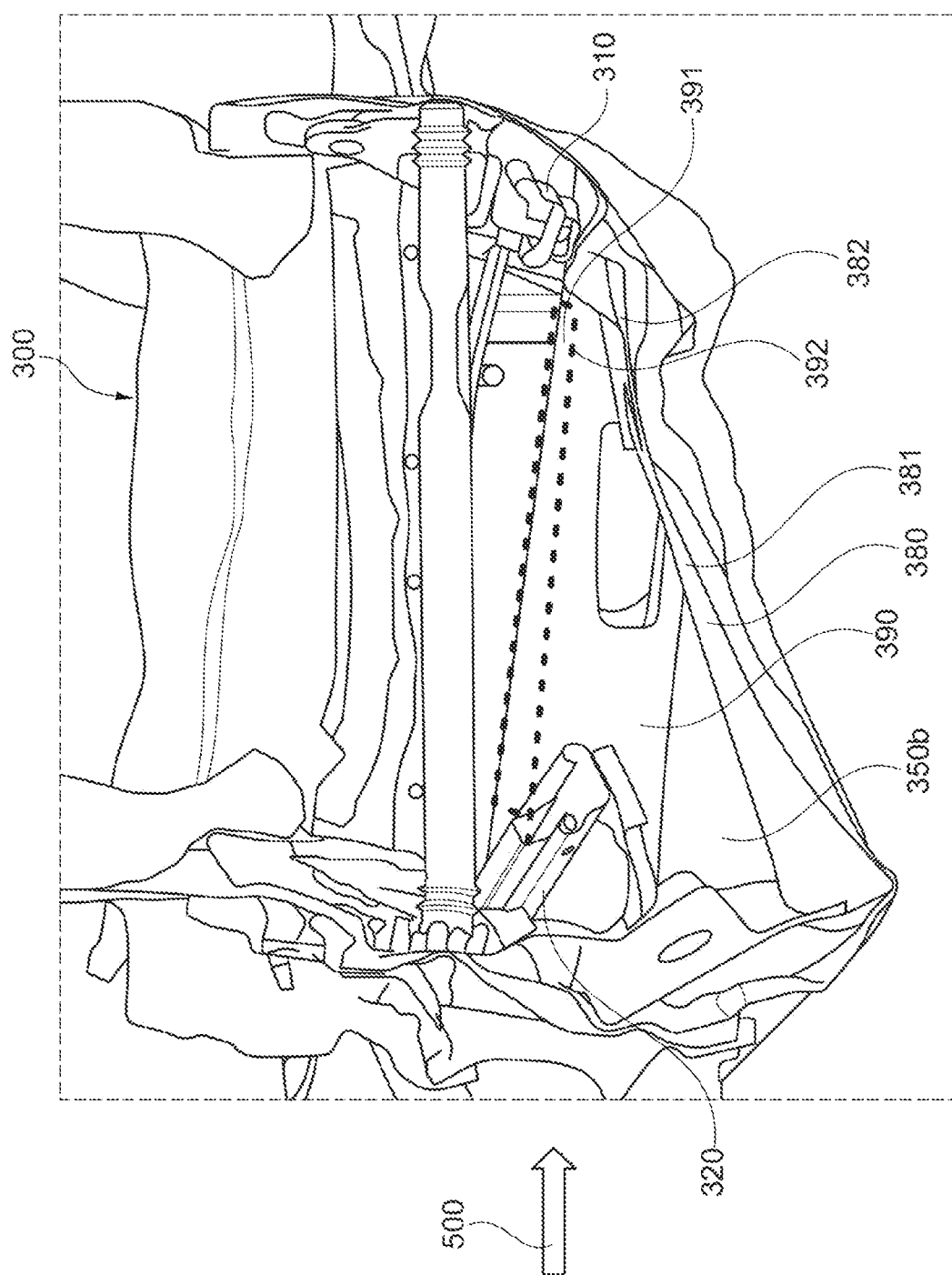
FIG. 2 shows a partially sectional rear view of an exemplary assembly including portion of a vehicle seat and portion of a vehicle floor with a vehicle battery and fixing arrangements removed for illustration.

In a sectional rear view of a vehicle seat 300 in FIG. 2 the behavior of the cross members 380, 390 in a side impact 500 is shown. A first, center-tunnel seat rail 310 and a second, side-sill seat rail 320 rest indirectly or directly on the first or front cross member 390 and the second or rear cross member 380. The seat rails 310, 320 can be fixed to the first cross member supporting surface 391 of the first cross member 390 and to the second cross member supporting surface 381 of the second cross member 380. The first cross member 390 is of stiffened design compared to the second cross member 380. In order, if at all possible, not to direct the impact energy at the vehicle occupant on the affected vehicle seat 300 in the event of a side impact 500, the vehicle floor 350b bends or buckles away downwards. Furthermore, the rear cross member supporting surface 381, of less stiffened design than the front cross member supporting surface 391, likewise bends or buckles away downwards, so that the load path in the rear area of the vehicle is relieved. Owing to the stiffening arrangement of the cross members 380, 390, a first inherently stable area 392 remains on the first cross member supporting surface 391 of the first cross member 390. This first inherently stable area 392 extends substantially over the entire area of the first cross member supporting surface 391. In contrast to this, the second cross member supporting surface 381 of the second cross member 390 includes a second inherently stable area 382 only in proximity to the center tunnel (not shown) or in the area of the center-tunnel seat rail 310. For mounting the vehicle battery 200, the first inherently stable area 392 is designed for fitting the first fixing arrangement 110 and the second inherently stable area 382 for fitting the second fixing arrangement 115 (cf. FIG. 3).

Figure 3:
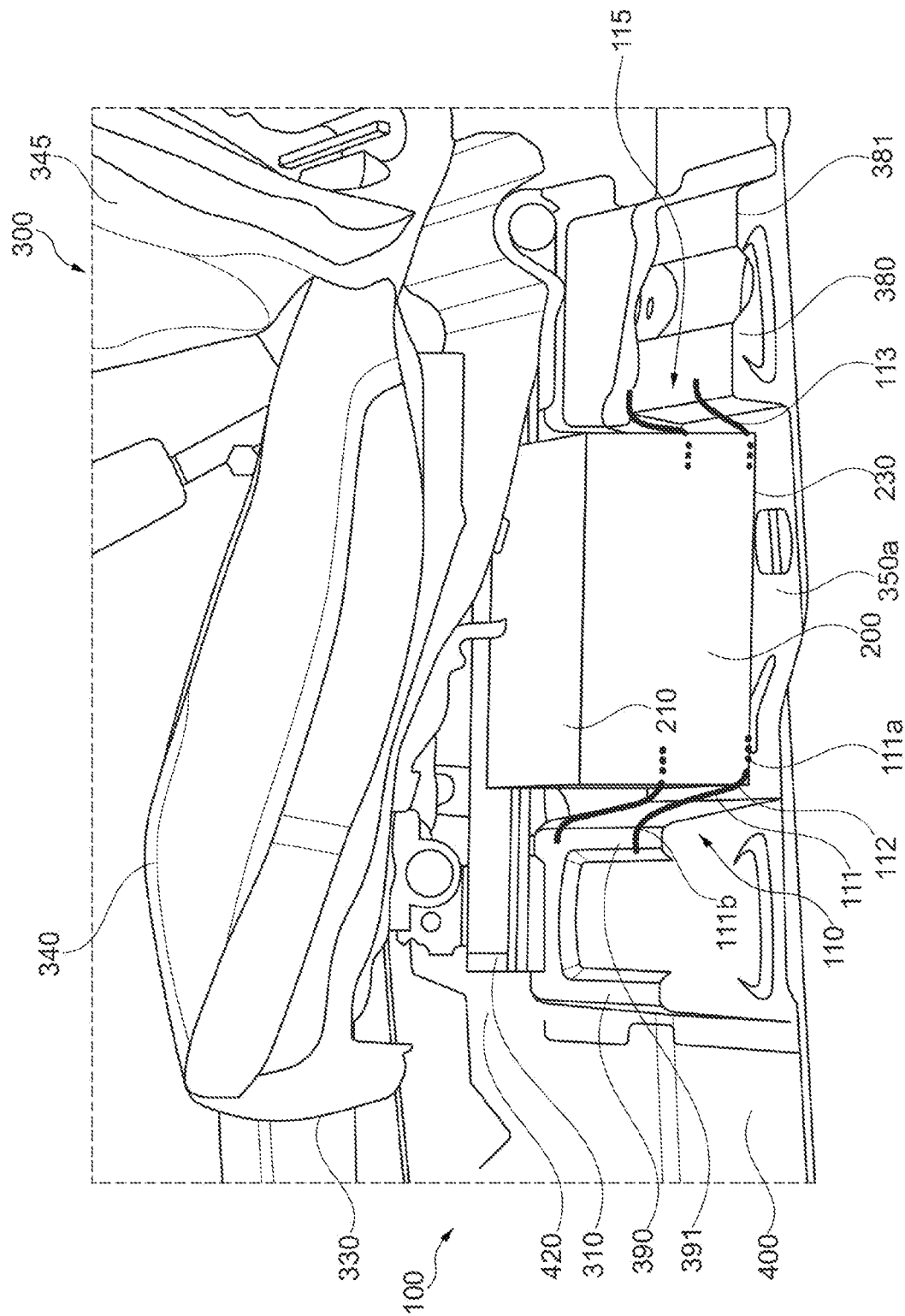
FIG. 3 shows a perspective side view of the assembly of FIG. 2.

FIG. 3 shows an assembly 100 having a vehicle battery 200 and a vehicle seat 300 arranged above the vehicle battery 200. The vehicle floor 350a is situated underneath the vehicle battery 200. The vehicle seat 300 includes a seat surface 340 and a seat backrest 345. The seat frame or the seat bottom construction 330 includes the first, center-tunnel seat rail 310 and the second, side-sill seat rail 320 (shown in FIG. 2). The seat bottom construction 330 is arranged underneath the seat surface 340. Also forming part of the seat structure are the first or front cross member 390 and the second or rear cross member 380. The two cross members 380, 390 are designed either as an integral part of the vehicle floor 350a or separately. The upper wall of the first cross member 390 is the first cross member supporting surface 391 and the upper wall of the second cross member 380 is the second cross member supporting surface 381. The seat rails 310, 320 rest indirectly or directly on the cross member supporting surfaces 381, 391. The vehicle battery 200 is arranged between the cross members 380, 390; the upper side or the upper area 210 of the vehicle battery 200 is not fixed directly to the seat bottom construction 330, nor is the underside or the lower area 230 fixed directly to the vehicle floor 350a. Instead, the vehicle battery 200 is connected by way of a first fixing arrangement 110 to the first cross member 390 and by way of a second fixing arrangement 115 to the second cross member 380, in such a way that the fixing arrangements 110, 115 substantially hold the weight of the vehicle battery 200.

The first or front fixing arrangement 110 includes two retaining clips 111. The second or rear fixing arrangement 115 likewise includes two retaining clips 111. A retaining clip 111 or a fixing arrangement 110, 115 here includes a first portion 111a for fixing the retaining clip 111 or the fixing arrangement 110, 115 to an underside 230 of the vehicle battery 200. The retaining clip 111 or the fixing arrangement 110, 115 further includes a second portion 111b for fixing the retaining clip 111 or the fixing arrangement 110, 115 to a cross member 390, 380 or a cross member supporting surface 381, 391 of a cross member 380, 390. The connecting area lying between the first portion 111a and the second portion 111b is of elongated design in the form of a connecting strand 112. The retaining clip 111 is made of resilient material, for example resilient metal, so that the vehicle battery 200 is movably held in the fixing arrangements 110, 115. This allows compensating movements of the vehicle battery 200 in response to shocks or vibrations during travel. In the event of a side impact 500 in the area of the side sill (not shown) the vehicle battery 200 moves, for example through a swinging motion, oscillating motion, or swaying motion, in the direction of the center tunnel 420 and therefore utilizes the existing deformation space. The retaining clip 111 of the rear fixing arrangement 115 facing or adjacent to the side sill is designed as a predetermined break component 113. If the rear cross member 380 buckles downwards, the predetermined break component 113 systematically tears, buckles, or breaks in good time and prevents forces acting on the vehicle battery 200 which can lead to torsional or shear stresses in the vehicle battery.

Figure 4:
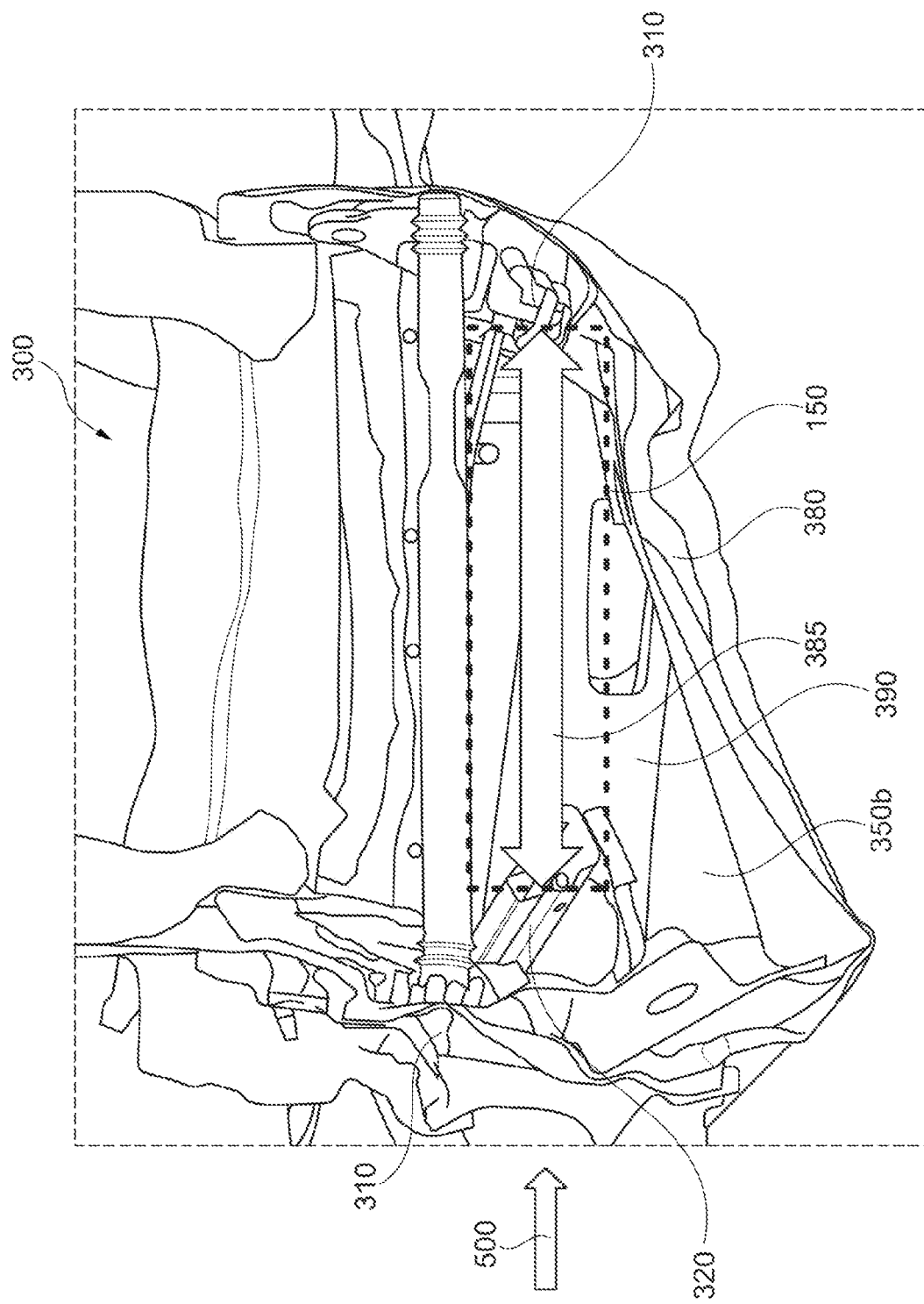
FIG. 4 shows a partially sectional rear view of the assembly of FIG. 2.

FIG. 4 shows the same representation as FIG. 2. The protective battery compartment 150, which extends between the seat rails 310, 320, is in particular represented. It is intended to prevent the two seat rails 310, 320 moving towards one another in the event of a side impact 500 and thereby reducing the size of the protective battery compartment 150. To strengthen this protective battery compartment 150, at least one additional cross strut or an additional cross member 385 is provided. Although the vehicle battery 200 (cf. FIG. 3) is movably supported inside this protective battery compartment 150 in an intended manner, the vehicle battery 200 is still protected in the event of a side impact 500 due to the stiffening of the first cross member 390, the second cross member 380 and the additional cross member 385.

LIST OF REFERENCE NUMERALS 100 assembly
110 first or front fixing arrangement
111 retaining clip
111a first portion 111b second portion
112 connecting strand
113 predetermined break component
115 second or rear fixing arrangement
120 direction of movement
150 protective battery compartment
200 vehicle battery
200a position of the vehicle battery before impact
210 upper area
230 lower area
300 vehicle seat
310 first, center-tunnel seat rail
320 second, side-sill seat rail
330 seat bottom construction
340 seat surface
345 seat backrest
350a vehicle floor (undeformed)
350b vehicle floor (deformed)
380 second or rear cross member
381 second or rear cross member supporting surface
382 second or rear inherently stable area
385 additional cross member
390 first or front cross member
391 first or front cross member supporting surface
392 first or front inherently stable area
400 vehicle body
420 center tunnel
500 side impact/vehicle impact

The invention claimed is:

1. An assembly for a hybrid motor vehicle comprising:
a vehicle floor;
a vehicle seat having a seat surface and a seat bottom construction, which vehicle seat is connected to the vehicle floor by the seat bottom construction;
a vehicle battery, wherein the vehicle battery is arranged underneath the vehicle seat and above the vehicle floor;
a first stiffened cross member arranged in front of the vehicle battery in the direction of travel;
a second stiffened cross member arranged behind the vehicle battery in the direction of travel;
a first fixing arrangement; and
a second fixing arrangement;
wherein the vehicle battery is connected to the first cross member by the first fixing arrangement and to the second cross member by the second fixing arrangement; and
wherein the vehicle battery is arranged above the vehicle floor suspended from the first cross member by the first fixing arrangement and suspended from the second cross member by the second fixing arrangement.

2. The assembly of claim 1, wherein the first fixing arrangement and the second fixing arrangement are connected to the vehicle battery on the underside or in a lower area of the vehicle battery.

3. The assembly of claim 1, wherein the first cross member is additionally stiffened in its design compared to the second cross member.

4. The assembly of claim 1, wherein the first cross member includes a first cross member supporting surface, the second cross member includes a second cross member supporting surface, and the first fixing arrangement and the second fixing arrangement each include a first portion for connection to the vehicle battery and a second portion for connection to a respective one of the first cross member supporting surface or the second cross member supporting surface.

5. The assembly of claim 1, wherein the first fixing arrangement and the second fixing arrangement each include at least one elongated retaining clip.

6. The assembly of claim 5, wherein the first fixing arrangement includes two retaining clips for connecting the vehicle battery to the first cross member, and the second fixing arrangement includes two retaining clips for connecting the vehicle battery to the second cross member.

7. The assembly of claim 6, wherein one of the retaining clips of the second fixing arrangement is a predetermined break component.

8. The assembly of claim 7, wherein the retaining clip of the second fixing arrangement that is the predetermined break component is closer to a side sill than the retaining clip of the second fixing arrangement that is not the predetermined break component.

9. The assembly of claim 1, wherein the first fixing arrangement and the second fixing arrangement are deformable in a predefined manner to allow for a movement of the vehicle battery in a vehicle transverse direction.

10. The assembly of claim 1, wherein at least one of the first fixing arrangement or the second fixing arrangement is formed with a predetermined break component.

11. The assembly of claim 1, wherein the vehicle seat includes a first seat rail, a second seat rail, and at least one additional cross member extending from the first seat rail to the second seat rail.

12. An assembly for a hybrid motor vehicle comprising:
a vehicle floor;
a vehicle seat having a seat surface and a seat bottom construction, which vehicle seat is connected to the vehicle floor by the seat bottom construction;
a vehicle battery, wherein the vehicle battery is arranged underneath the vehicle seat and above the vehicle floor;
a first stiffened cross member arranged in front of the vehicle battery in the direction of travel;
a second stiffened cross member arranged behind the vehicle battery in the direction of travel;
a first fixing arrangement; and
a second fixing arrangement;
wherein the vehicle battery is connected to the first cross member by the first fixing arrangement and to the second cross member by the second fixing arrangement; and
wherein the first fixing arrangement and the second fixing arrangement are deformable in a predefined manner to allow for a movement of the vehicle battery in a vehicle transverse direction.

13. The assembly of claim 12, wherein the first fixing arrangement and the second fixing arrangement are connected to the vehicle battery on the underside or in a lower area of the vehicle battery.

14. The assembly of claim 12, wherein the vehicle battery is arranged above the vehicle floor suspended from the first cross member by the first fixing arrangement and suspended from the second cross member by the second fixing arrangement.

15. The assembly of claim 12, wherein the first cross member is additionally stiffened in its design compared to the second cross member.

16. The assembly of claim 12, wherein the first cross member includes a first cross member supporting surface, the second cross member includes a second cross member supporting surface, and the first fixing arrangement and the second fixing arrangement each include a first portion for connection to the vehicle battery and a second portion for connection to a respective one of the first cross member supporting surface or the second cross member supporting surface.

17. An assembly for a hybrid motor vehicle comprising:
a vehicle floor;
a vehicle seat having a seat surface and a seat bottom construction, which vehicle seat is connected to the vehicle floor by the seat bottom construction;
a vehicle battery, wherein the vehicle battery is arranged underneath the vehicle seat and above the vehicle floor;
a first stiffened cross member arranged in front of the vehicle battery in the direction of travel;
a second stiffened cross member arranged behind the vehicle battery in the direction of travel;
a first fixing arrangement; and
a second fixing arrangement;
wherein the vehicle battery is connected to the first cross member by the first fixing arrangement and to the second cross member by the second fixing arrangement; and
wherein at least one of the first fixing arrangement or the second fixing arrangement is formed with a predetermined break component.

18. The assembly of claim 17, wherein the first fixing arrangement and the second fixing arrangement are connected to the vehicle battery on the underside or in a lower area of the vehicle battery.

19. The assembly of claim 17, wherein the vehicle battery is arranged above the vehicle floor suspended from the first cross member by the first fixing arrangement and suspended from the second cross member by the second fixing arrangement.

20. The assembly of claim 17, wherein the first cross member is additionally stiffened in its design compared to the second cross member.

* * * * *